April 7, 1936.  R. S. GRIMSHAW  2,036,472

CONCEALED SPARE WHEEL

Filed June 21, 1934

Inventor
Robert S. Grimshaw

By Blackmore, Spencer & Flint
Attorneys

Patented Apr. 7, 1936

2,036,472

UNITED STATES PATENT OFFICE 2,036,472

CONCEALED SPARE WHEEL

Robert S. Grimshaw, Detroit, Mich., assignor to General Motors Corporation, Detroit, Mich., a corporation of Delaware Application June 21, 1934, Serial No. 731,596

3 Claims. (Cl. 296—37)

This invention relates to improvements in the manner of mounting a spare wheel upon a motor car.

An object of my invention is to mount the spare wheel upon the body so that it is concealed from view and does not interfere with the streamline of the car.

A further object of my invention is to mount the spare wheel upon the body so that it is easy to handle when dirty and easily removed without the necessity of the driver lifting the whole weight of the wheel at arm's length.

A still further object is to so mount the spare wheel that it will occupy a minimum of space and be substantially out of the way and the original design's character will be obtained with but a slight protrusion of the tire cover contour.

With these and other objects in view my invention consists in the construction as described in the specification, claimed in the claims and shown in the accompanying drawing, in which:

Figure 1:
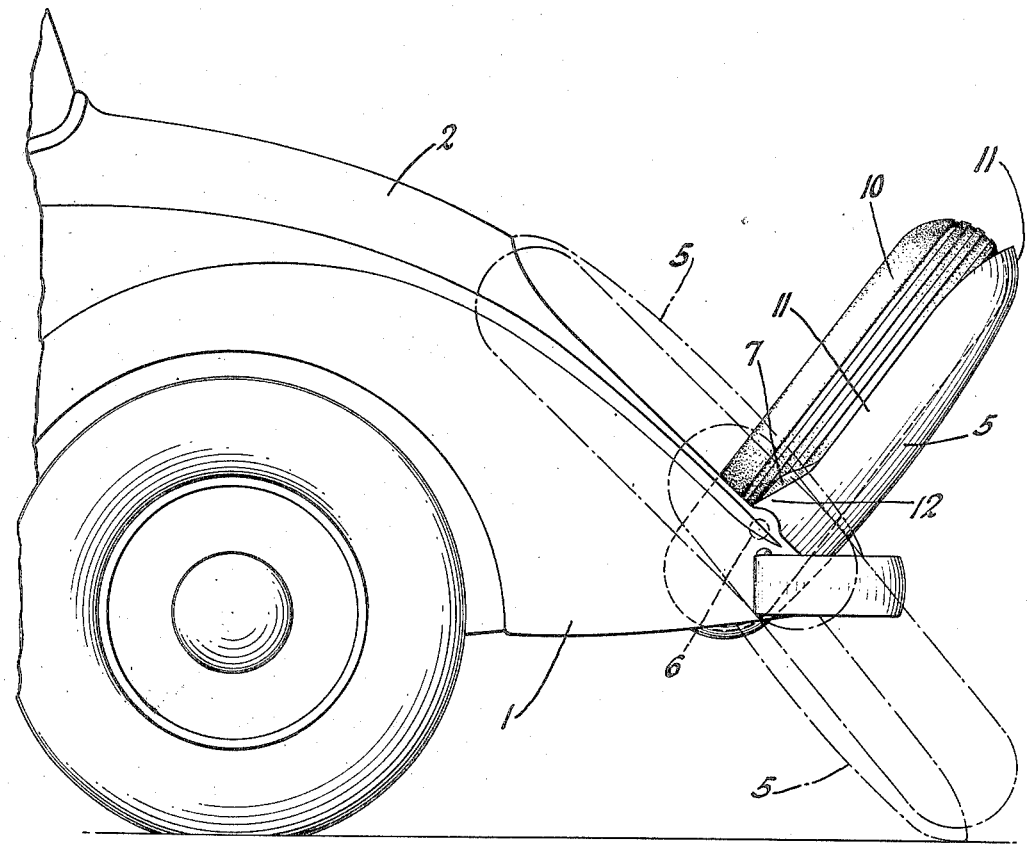
Figure 1 shows a side elevation of the rear portion of the car with the spare wheel and cover in a partially open position.
Figure 2:
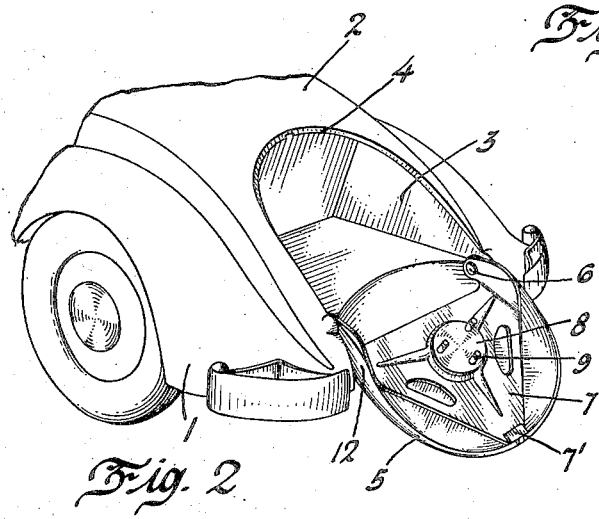
Figure 2 is a perspective view of the rear of a car showing the spare wheel cover and support in its fully opened position.

A motor car 1 has a top deck or rear panel 2 which extends over the rear storage compartment 3. In the deck 2 is cut out a large U-shaped opening 4 for access to the storage compartment. A circular cover or door 5 fits over the opening to enclose it and it is pivoted at two spaced points 6 on its periphery at the rear thereof. On the inside face of the cover is secured a triangular shaped bracket 7 at the pivot points 6 and the under latch 7' which carries a circular plate 8 at its center to which are secured bolts 9 for supporting the spare wheel 10. The edge of the cover is beveled, as at 11, to surround the sides of the tire and to form ears 12 by which the cover is pivoted.

As can best be seen in Figure 1, which shows the wheel and cover in three positions, when the cover is closed the wheel lies within the rear compartment and takes up a minimum of space, and when the cover is open the extreme end touches the ground and it is only necessary to remove the wheel nuts and stand the wheel up straight to remove it. When the wheel has been changed and the other wheel secured in the cover the driver merely has to pick up the lower edge and fold the whole into the rear. In this way he is not required to lift the whole weight of the wheel as part of it is beyond the pivot and its weight assists in raising the remainder.

It will therefore be seen that I have provided a device in which the spare wheel is normally out of sight, but from which the wheel may easily be removed and which is simple, economical and easy to install.

I claim:

1. Means for securing a spare wheel on the inside of a pivoted and latched cover for an opening in the rear deck of a car comprising a triangular shaped support secured to the cover at its pivot points and latch and a circular hub supporting disk secured to the center of the triangular member to hold the wheel.

2. In a motor car, a rear deck having an opening therein, a circular cover pivoted on two peripheral points to close the opening, a triangular shaped plate carried by the inner face of the cover and secured at the two pivotal points, a disk carried by the center of the plate to which a spare wheel may be secured, and a beveled edge on the cover to follow the curve of a tire and to protect the same.

3. In a motor car, a body panel having an opening therein, a substantially circular sheet metal cover for the opening, a pair of pivot points peripherally spaced for the cover, a triangular brace plate for carrying a spare wheel on the inner surface of the cover, the edges of the cover and the plate being turned up together adjacent the pivot points to give a sufficient pivot bearing, whereby the wheel on the plate lies inside the body when the cover is closed.

ROBERT S. GRIMSHAW.